United States Patent
Karthik et al.

(10) Patent No.: US 12,411,975 B2
(45) Date of Patent: Sep. 9, 2025

(54) INCREMENTAL SYNCHRONIZATION OF METADATA

(71) Applicant: Rubrik, Inc., Palo Alto, CA (US)

(72) Inventors: Vijay Karthik, Santa Clara, CA (US); Akhilesh Krishnan, Sunnyvale, CA (US); Dhawal Upadhyay, Mountain View, CA (US); Kevin Mu, Santa Clara, CA (US)

(73) Assignee: Rubrik, Inc., Palo Alto, CA (US)

( * ) Notice: Subject to any disclaimer, the term of this patent is extended or adjusted under 35 U.S.C. 154(b) by 370 days.

(21) Appl. No.: 18/094,918

(22) Filed: Jan. 9, 2023

(65) Prior Publication Data

US 2024/0232418 A1     Jul. 11, 2024

(51) Int. Cl.
| | |
|---|---|
| *G06F 21/62* | (2013.01) |
| *G06F 11/14* | (2006.01) |
| *G06F 16/25* | (2019.01) |
| *G06F 16/27* | (2019.01) |
| *G06F 16/23* | (2019.01) |

(52) U.S. Cl.
CPC ...... *G06F 21/6227* (2013.01); *G06F 11/1464* (2013.01); *G06F 16/25* (2019.01); *G06F 16/27* (2019.01); *G06F 16/275* (2019.01); *G06F 21/6272* (2013.01); *G06F 16/2322* (2019.01)

(58) Field of Classification Search
CPC .. G06F 21/62; G06F 21/6227; G06F 21/6218; G06F 21/6272; G06F 16/20; G06F 16/25; G06F 16/258; G06F 16/23; G06F 16/2322; G06F 16/27; G06F 16/275; G06F 16/28; G06F 11/1464
See application file for complete search history.

(56) References Cited

U.S. PATENT DOCUMENTS

| | | | |
|---|---|---|---|
| 2017/0031779 A1* | 2/2017 | Helliker | H04L 67/60 |
| 2018/0018346 A1* | 1/2018 | Esaka | G06F 16/183 |
| 2020/0341856 A1* | 10/2020 | Chen | G06F 11/1453 |
| 2021/0124826 A1* | 4/2021 | Matsuda | G06F 21/6218 |
| 2023/0142346 A1* | 5/2023 | Menezes | G06F 11/1451 711/162 |
| 2023/0289347 A1* | 9/2023 | Gibson | G06F 16/2365 |
| 2024/0296099 A1* | 9/2024 | Mishra | G06F 11/1464 |
| 2025/0061090 A1* | 2/2025 | Khobragade | G06F 16/1737 |

* cited by examiner

*Primary Examiner* — Shaqueal D Wade-Wright
(74) *Attorney, Agent, or Firm* — Holland & Hart LLP

(57) ABSTRACT

Methods, systems, and devices for data management are described. Data management clusters may be configured to store metadata associated with providing data protection for a set of computing objects. A data management cluster may be triggered to export respective metadata to a cloud environment, where the respective metadata may be associated with providing data protection for one or more of the computing objects. Based on the export operation being triggered, the respective metadata may be downloaded from the cloud environment and written to a database that is configured to store a version of the metadata associated with providing the data protection for the set of computing objects. An interface for managing the operation of the data management clusters may be provided, where a content of the interface may reflect the version of the metadata stored at the database.

20 Claims, 8 Drawing Sheets

DMS 210

INCREMENTAL SYNCHRONIZATION OF METADATA

FIELD OF TECHNOLOGY

The present disclosure relates generally to data management, including techniques for incremental synchronization of metadata.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
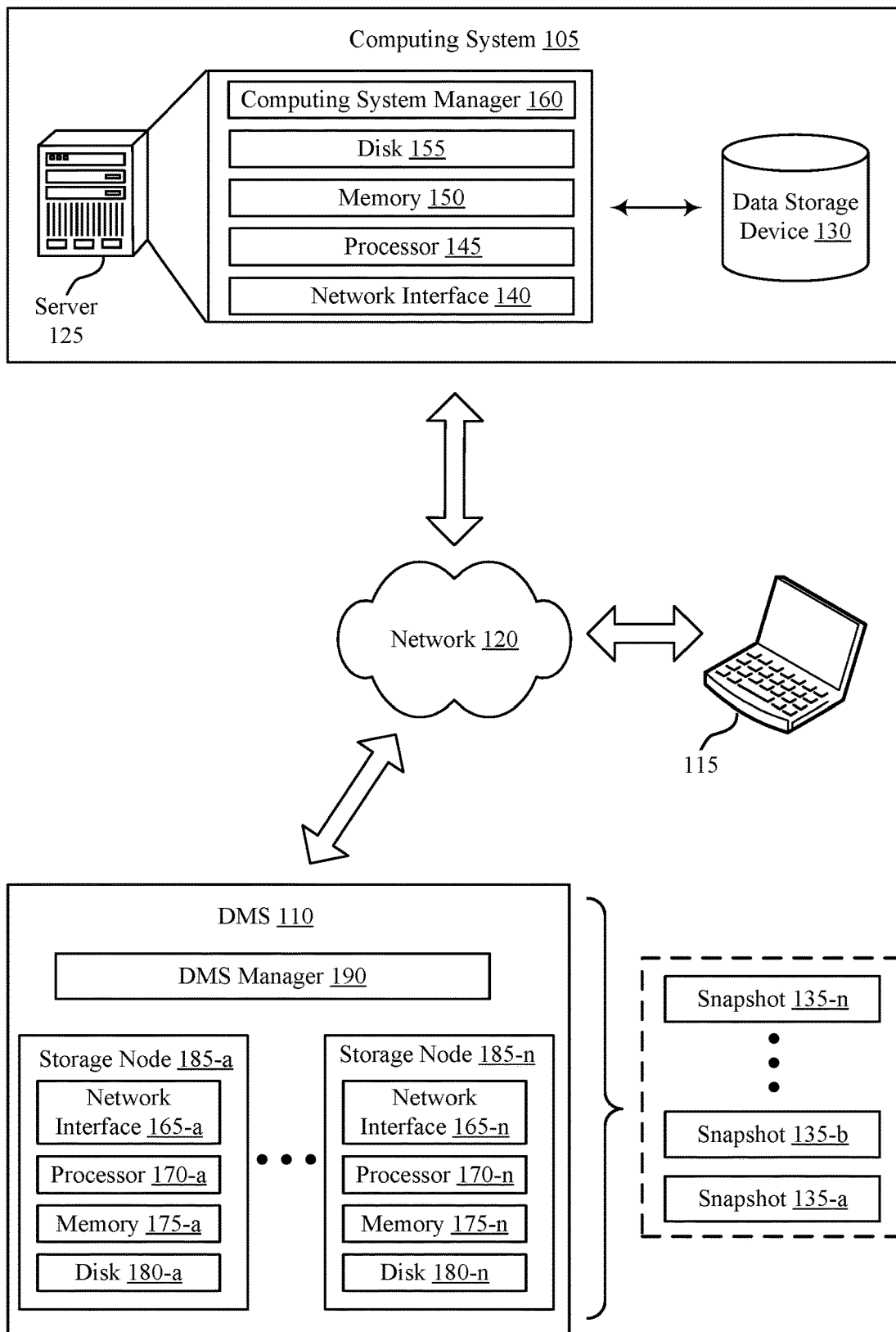
FIG. 1 illustrates an example of a computing environment that supports incremental synchronization of metadata in accordance with aspects of the present disclosure.

A data management system may be used to protect one or more computing objects (e.g., databases, virtual machines, etc.) for one or more computing systems that are operated by one or more customers. In some examples, the data management system (e.g., data management clusters of a data management system) may be distributed across a large geographic region. To facilitate management of the data management system, the data management system may include a centralized management system that provides a unified interface for managing the operation of the data management system. For example, the centralized management system may display the computing objects protected by multiple data management clusters along with data protection information for the computing objects (such as service level agreements for the computing objects, available snapshots, and the like) and may enable a user to modify the data protection information for the computing objects via the centralized management system (e.g., rather than at the respective DMS clusters).

In some examples, the data management clusters may locally store data protection information for respective computing objects that are protected by respective data management clusters (which may be referred to as data protection metadata, cluster-level data protection metadata, or cluster-level metadata, or metadata). Accordingly, to enable the centralized management system to display the data protection information for the computing objects, the data management system may perform operations to synchronize the cluster-level data protection metadata locally stored by the data management clusters with one or more versions (e.g., an aggregated version) of the cluster-level data protection metadata stored at the centralized management system.

In some examples, the networking infrastructure of the data management system may be less developed in certain geographic regions. For example, the networking infrastructure in certain geographic regions may have fewer redundant network links, use network links that are more susceptible to the elements (e.g., wind, tree limbs, etc.), and/or may support lower data rates than in other geographic regions. Moreover, in some examples, networking protocols (e.g., HTTP/HTTPS) for communicating over the networking infrastructure of the data management system may not support the efficient transfer of large amounts of data. Thus, the networking infrastructure in those geographic regions may be more susceptible to disruptions that cause connections to data management clusters in those geographic regions to be lost. Additionally, or alternatively, the networking infrastructure may not support the transfer of the cluster-level data protection metadata at sufficient data rates.

Accordingly, synchronization procedures for data management clusters in those geographic regions may fail at a higher rate or take excessive amounts of time, which may increase a likelihood and frequency of the data protection metadata stored at the centralized management system being out-of-sync with the actual data protection metadata stored at those data management clusters. Divergence in the version of the data protection metadata stored at the centralized management system with the actual data protection metadata stored at the data management clusters may result in cluster management errors, cluster management failures, or both. Thus, techniques and configurations for reliably and quickly synchronizing the version of the data protection metadata stored at the centralized management system with the cluster-level data protection metadata stored at the data management clusters may be desired.

To reliably and quickly synchronize the version of the data protection metadata stored at the centralized management system with the cluster-level data protection metadata, the data management clusters may be configured to export respective data protection metadata to a third-party server network (e.g., Google Cloud, or the like), and the centralized management system may be configured to load the respective data protection metadata from the third-party server network. In some examples, the third-party server network may have a well-developed network infrastructure that provides redundant and high-bandwidth coverage for many (or all) of the geographic regions that include the centralized management system and the data management clusters.

FIG. 1 illustrates an example of a computing environment 100 that supports incremental synchronization of metadata in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150), and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below:

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state-which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

The DMS 110 may include multiple data management clusters that are configured to store metadata associated with providing data protection for a set of computing objects in the computing system 105. A data management cluster may be triggered to export respective metadata to a cloud environment, where the respective metadata may be associated with providing data protection for one or more of the computing objects. Based on the export operation being triggered, the respective metadata may be downloaded from the cloud environment and written to a database that is configured to store a version of the metadata associated with providing the data protection for the set of computing objects. An interface for managing the operation of the data management clusters may be provided, where a content of the interface may reflect the version of the metadata stored at the database.

Figure 2:
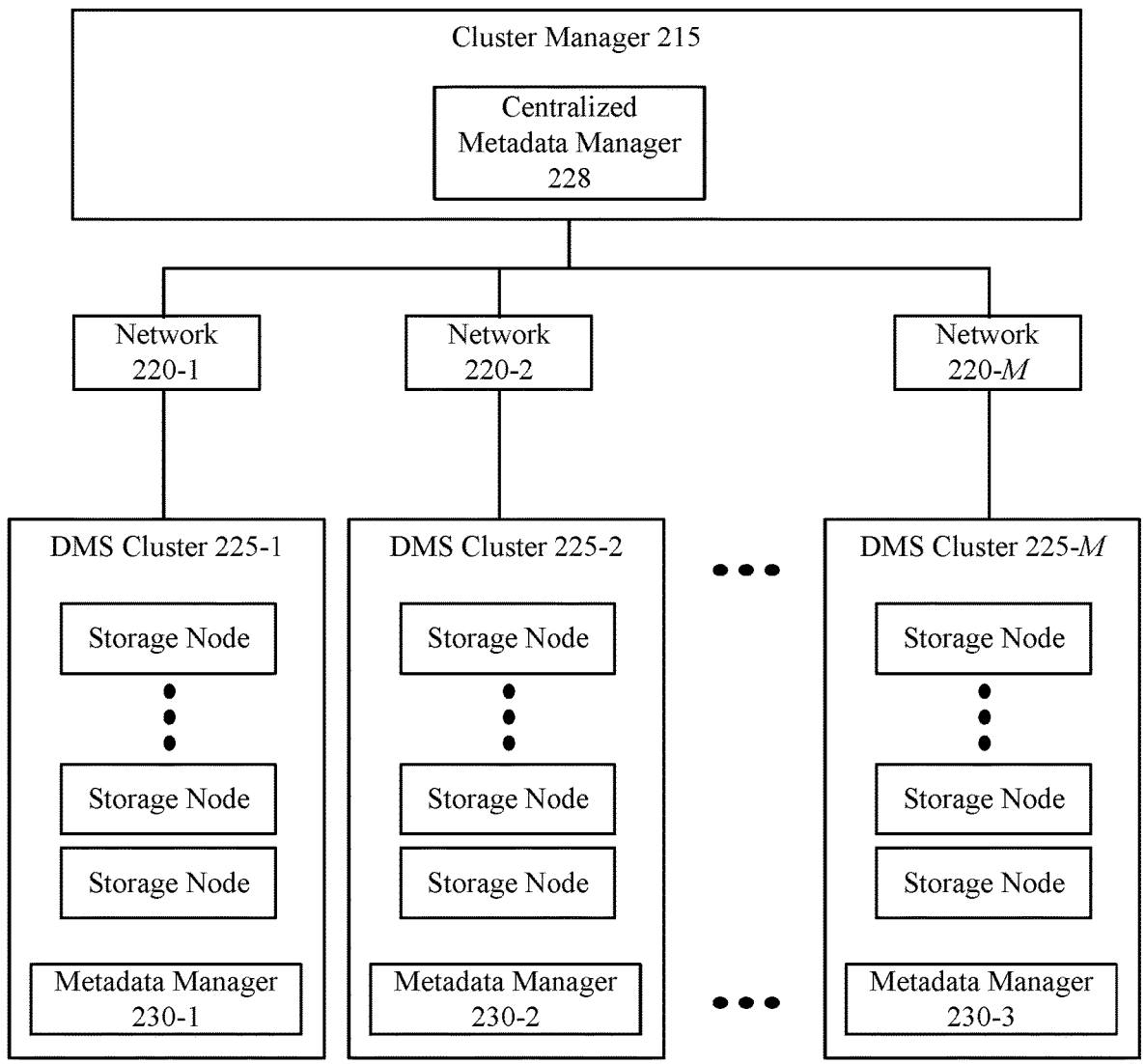
FIG. 2 illustrates an example of a data management system that supports incremental synchronization of metadata in accordance with aspects of the present disclosure.

FIG. 2 illustrates an example of a data management system that supports incremental synchronization of metadata in accordance with examples as disclosed herein.

The DMS 210 may be configured to protect one or more computing systems (e.g., the computing system 105 of FIG. 1). The DMS 210 may include a cluster manager 215 and the DMS clusters 225. The DMS 210 may be an example of a DMS described herein (e.g., the DMS 110 of FIG. 1).

The cluster manager 215 may be configured to access and control an operation of the DMS clusters 225. For example, the cluster manager 215 may provide a centralized portal through which a user may determine a state (and, in some examples, manage an operation) of each of the DMS clusters 225 on an individual basis. A user may also use the centralized portal to modify aspects of the data protection provided by the DMS clusters. For example, the user may modify, via the portal, an SLA for one or more computing resources protected by the DMS clusters. The cluster manager 215 may be connected to the DMS clusters 225 via the networks 220.

The DMS clusters 225 may be configured to protect one or more computing systems (e.g., the computing system 105). In some examples, different DMS clusters may provide data protection for different computing resources in a computing system—e.g., one of the DMS clusters 225 may protect a database of the computing system, another of the DMS clusters 225 may protect virtual machines of the computing system, an additional of the DMS clusters 225 may protect physical machines of the computing system, and so on. In some examples, multiple of the DMS clusters 225 may provide redundant protection for one or more of the computing resources in the computing system.

The DMS clusters 225 may be located in physically separate geographic regions—e.g., one DMS cluster may be located on a west side of a country, another DMS cluster may be located on an east side of a country, and so on. Accordingly, each of the DMS clusters 225 may connect to the cluster manager 215 using different networks, where the networks 220 used by the DMS clusters may include one or more overlapping network links. In some examples, certain networks may be more reliable than others (e.g., on average or at particular times). For example, a winter storm on one side of the country that affects one network may cause one or more of the DMS clusters 225 to lose a connection to the cluster manager 215 without affecting a connection of other of the DMS clusters 225 to the cluster manager 215. In some examples, each of the DMS clusters 225 may include one or more storage nodes, which may be examples of storage nodes described herein (e.g., the storage nodes 185 of FIG. 1).

The DMS clusters 225 may each maintain metadata that describes the data protection scheme supported by the DMS cluster. For example, the first DMS cluster 225-1 may store metadata that indicates an SLA (e.g., a backup/retention schedule) for each computing resource protected by the first DMS cluster 225-1. Additionally, or alternatively, the metadata stored by the first DMS cluster 225-1 may indicate relationships between computing resources—e.g., a relationship indicating that a change to an SLA of one computing resource should be applied to additional computing resources. Additionally, or alternatively, the metadata may further indicate failover resources for the computing resources, existing snapshots taken for the computing resources, and so on. In some examples each of the DMS clusters 225 may include a respective metadata manager (e.g., one of the metadata managers 230), which may be configured to manage (e.g., update) data protection metadata for the computing resources protected by a respective DMS cluster.

To determine a state and manage an operation of the DMS clusters 225, the cluster manager 215 may maintain a version of the data protection metadata stored at the DMS clusters 225. The version of the data protection metadata may be stored at the centralized metadata manager 228. The cluster manager 215 may use the stored version of the data protection metadata to indicate, to a user, the data protection states of the DMS clusters 225 (e.g., current SLAs, existing snapshots, etc., for protected computing resources). Thus, a user may manage the operation of the DMS clusters 225 in accordance with the stored version of the data protection metadata.

As described herein, a connection between a DMS cluster and the cluster manager 215 may be lost (e.g., for hours, weeks, etc.). In some examples, while a connection to the cluster manager 215 is lost, a connection between the DMS cluster and the computing system protected by the DMS cluster may be maintained. Accordingly, the DMS clusters 225 may continue to provide data protection services for the computing system regardless of whether a connection to the cluster manager 215 is available—e.g., based on configured SLAs. In such cases, a version of the data protection metadata for the DMS cluster stored at the cluster manager 215 may become out-of-sync with the actual data protection metadata stored at the DMS cluster, and the information provided by the cluster manager to a user for managing the DMS cluster may become out-of-date, which may result in cluster management errors, cluster management failures, or both.

Additionally, or alternatively, the cluster manager 215 may access and manage the operation of the DMS clusters 225 via APIs for the DMS clusters. In such cases, the cluster manager 215 may send a command to modify data protection schemes at the DMS clusters 225, but the DMS clusters 225 may themselves affect any changes to respective data protection schemes. To affect the changes to the data protection schemes, the DMS clusters 225 (e.g., the metadata managers 230) at the DMS cluster) may modify respective data protection metadata for the protected computing resources in accordance with the changes to the data protection scheme. In some examples, the modifications to the metadata may be obfuscated from (and indeterminate from the perspective of) the cluster manager 215. Accordingly, changes to a data protection scheme at a DMS cluster (triggered by the cluster manager 215) may result in changes to the cluster-level data protection metadata that are unknown to the cluster manager 215. These indeterminate changes may similarly cause the version of the data protection metadata for the DMS cluster stored at the cluster manager 215 to become out-of-sync with the actual data protection metadata stored at the DMS cluster.

In some examples, the version of the data protection metadata stored at the cluster manager 215 and the data protection metadata stored at the DMS clusters may remain out-of-sync until the cluster-level data protection metadata is synchronized with the version of the data protection metadata stored at the cluster manager 215. Accordingly, the cluster manager 215 may synchronize (e.g., periodically) its version of the data protection metadata with the cluster-level data protection metadata to maintain an up-to-date version of the data protection metadata. In some examples, synchronizing the cluster-level data protection metadata of a DMS cluster (e.g., a full cluster synchronization) may involve transferring hundreds of gigabytes of information.

As described herein, the DMS clusters 225 may be distributed across a large geographic region. In some examples, the networking infrastructure of the DMS 210 may be less developed in certain geographic regions. For example, the networking infrastructure in those geographic regions may have fewer redundant network links, use network links that are more susceptible to the elements (e.g., wind, tree limbs, etc.), and/or may support lower data rates than in other geographic regions. Moreover, in some examples, networking protocols (e.g., HTTP/HTTPS) for communicating over the networking infrastructure of the data management system may not support the efficient transfer of large amounts of data. Thus, the portion of the networking infrastructure in those geographic regions may be more susceptible to disruptions that cause connections between the cluster manager 215 and DMS clusters in the associated geographic regions (or vice versa) to be lost. Additionally, or alternatively, the networking infrastructure may not support the transfer of the cluster-level data protection metadata at sufficient data rates.

Accordingly, synchronization procedures for DMS clusters in those geographic regions may fail at a higher rate or take excessive amounts of time, which may increase a likelihood and frequency of the data protection metadata stored at the cluster manager 215 being out-of-sync with the actual data protection metadata stored at those DMS clusters. Divergence in the version of the data protection metadata stored at the cluster manager 215 with the actual data protection metadata stored at the DMS clusters may result in cluster management errors, cluster management failures, or both. Thus, techniques and configurations for reliably and quickly synchronizing the version of the data protection metadata stored at the cluster manager 215 with the cluster-level data protection metadata stored at the DMS clusters 225 may be desired.

To reliably and quickly synchronize the version of the data protection metadata stored at the cluster manager 215 with the cluster-level data protection metadata, the DMS clusters 225 may be configured to export respective data protection metadata to a third-party server network (e.g., Google Cloud, or the like), and the cluster manager 215 may be configured to load the respective data protection metadata from the third-party server network. In some examples, the third-party server network may have a well-developed network infrastructure that provides redundant and high-bandwidth coverage for many (or all) of the geographic regions that include the cluster manager 215 and the DMS clusters 225.

In some examples, the DMS clusters 225 are configured to provide data protection for a set of computing objects (e.g., included in a computing system). The DMS clusters 225 may also store metadata that is related to providing the data protection for the set of computing objects (which may also be referred to as data protection metadata). The data protection metadata may indicate SLAs for computing objects, a backup/retention schedule for computing objects, quarantine/anomaly status for data backups (e.g., snapshots) of computing objects, available data backups for the computing objects, etc.

The cluster manager 215 may be configured to manage an operation of the DMS clusters 225 and may be connected to the DMS clusters via the networks 220. In some examples, the cluster manager 215 provides a unified interface from which a user may manage (e.g., view, modify, etc.) the operation of each of the DMS clusters 225. To support the operation of the unified interface, the cluster manager 215 may maintain a centralized database that stores a version of the data protection metadata that is locally stored at each of the DMS clusters 225. In some examples, the cluster manager 215 may trigger one or more DMS cluster to export respective data protection metadata to a cloud environment and may download the respective data protection metadata from the cloud environment. Based on downloading the respective data protection metadata, the cluster manager 215 may write the downloaded metadata to the centralized database. In such cases, the content displayed by the unified interface may reflect the version of the data protection metadata stored in the centralized database.

By exporting and downloading respective data protection metadata to a cloud environment, a reliability and speed associated with synchronizing cluster-level data protection metadata to the centralized database may be increased—e.g., by taking advantage of the robust network and data transfer protocols of the cloud environment. Exporting and downloading respective data protection metadata to a cloud environment may additionally enable the synchronization of cluster-level data protection metadata while a connection between the centralized database and a DMS cluster is not active.

Figure 3:
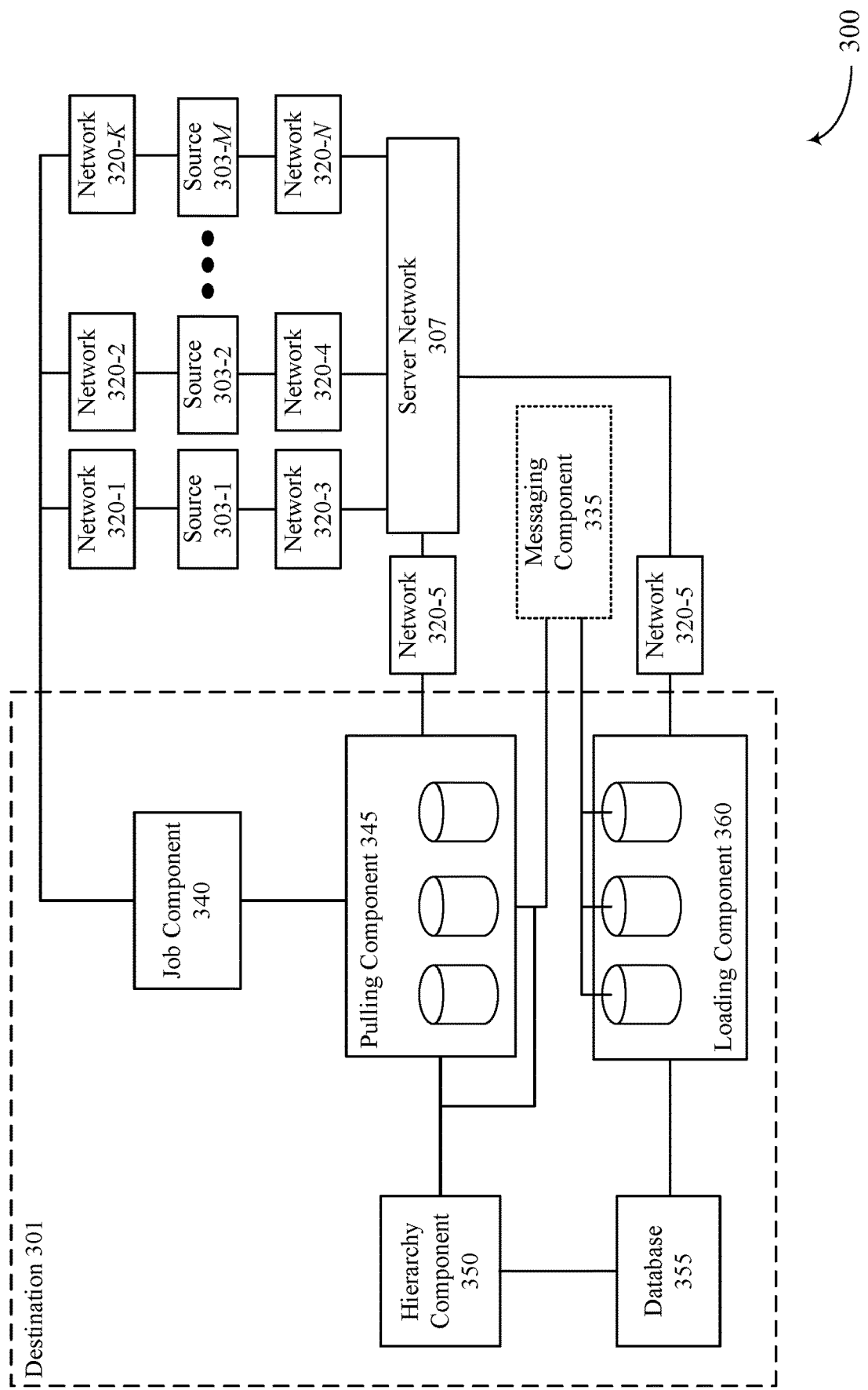
FIG. 3 illustrates an example of a data management subsystem that supports incremental synchronization of metadata in accordance with aspects of the present disclosure.

FIG. 3 illustrates an example of a data management subsystem that supports incremental synchronization of metadata in accordance with examples as disclosed herein.

The subsystem 300 may include the destination 301, the networks 320, the sources 303, the server network 307, and the messaging component 335. The destination 301 may be a part of a data management system (e.g., the DMS 110) and may be configured to manage a data protection scheme provided by the data management system for a computing system. The destination 301 may include, or be an example of, the cluster manager 215 of FIG. 2. The destination 301 may include the job component 340, the pulling component 345, the hierarchy component 350, the database 355, and the loading component 360.

The pulling component 345 may be configured to orchestrate the transfer of cluster-level data protection metadata (which may be referred to as "metadata" herein) to the destination 301. For example, the pulling component 345 may be configured to schedule (e.g., periodically or based on other parameters) metadata export operations for the sources 303. In some examples, the pulling component 345 may be configured to monitor, for each of the sources 303, a time since the last metadata export and may schedule metadata exports accordingly—e.g., the pulling component 345 may prioritize metadata exports for sources that have not exported metadata for a threshold duration.

The pulling component 345 may also be configured to monitor a progress of the metadata export operations and to trigger the loading component 360 to load exported metadata based on the progress of the metadata export operations. In some examples, to trigger the loading component 360 to load the exported metadata, the pulling component 345 may be configured to publish a message to the messaging component 335, from which the loading component 360 may asynchronously load messages intended for the loading component 360. Additionally, the pulling component 345 may be configured to perform post-processing for the database 355 after metadata is loaded into the database.

The job component 340 may be configured to send metadata export jobs to the sources 303. In some examples, the job component 340 sends the metadata export jobs to particular sources 303 in accordance with instructions received from the pulling component 345. A metadata export job may be a full export job or a partial export job. A full export job may trigger a source to export all of the metadata from the source to the server network 307. A partial export job may trigger a source to export a portion of the metadata from the source to the server network 307—e.g., only the portion of the metadata that has changed since a prior export job.

The loading component 360 may be configured to download exported metadata from the server network 307—e.g., based on receiving indications that discretized portions of metadata have been exported to the server network 307. In some examples, the loading component 360 may be configured to load messages from the messaging component 335, where the messages may indicate to the loading component that a portion of the exported metadata (e.g., a table) has been fully exported to the server network 307 and is ready for downloading. In some examples, the loading component 360 may be configured to download the exported metadata in an order that is based on dependencies between tables in the exported metadata. A table that is dependent on another table may wait for rows in the other table to be populated before updating its rows. The loading component 360 may be further configured to write the downloaded metadata into the database 355.

The hierarchy component 350 may be configured to propagate changes throughout the database 355 that result from writing the exported metadata into the database 355. For example, the hierarchy component 350 may identify from the database changes that an SLA has been changed for a computing resource (e.g., a VM group), and may propagate the changes to other computing resources (e.g., a set of VMs) that are linked with the computing resource.

The database 355 may be configured to store a metadata version that is intended to reflect (e.g., as closely as possible) the metadata stored in the sources 303. The metadata version stored in the database 355 may be used by the data management system to indicate, to a user, data protection states for each of the sources 303, and a user may use the data protection states to manage a data protection scheme for a computing system operated by the user.

The sources 303 may also be a part of the data management system and may be configured to protect the data in the computing system (e.g., by taking and storing snapshots, performing data observation, etc.). The sources 303 may be examples of the DMS clusters 225 of FIG. 2. In some examples, the sources 303 may be distributed across a geographic region. As described herein, the sources 303 may maintain metadata associated with providing data protection for computing systems—e.g., backup schedules, snapshot schedules, retention schedules, quarantine status, etc. As also described herein, the metadata stored at the sources 303 may diverge from the metadata version stored at the destination 301—e.g., if changes are made directly to a source (not through the destination 301), if changes are made at a source that has lost (e.g., temporarily) its connection to the destination 301, when a source executes a data management command received from the destination 301, etc. The sources 303 may be configured to export metadata to the server network 307 in accordance with an export job received from the job component 340.

In some examples, the sources 303 may include time sources that are monotonic and hardened against time variation. The time sources may be managed separately from system time sources at the sources 303. By contrast to the system time source, the second time source may be a monotonically increasing time source that will not move backwards in time. In further contrast to the system time source, the second time source may be hardened against time jumps—e.g., because the second time source uses a monotonic clock to measure the progress of time instead of synchronizing to a time reference of an external server. In some examples, the second time source may be configured to measure an elapsed time since the occurrence of an event—e.g., by counting a quantity of unit intervals (e.g., nanoseconds) that have elapsed since the event. The event may be the initialization of a source. In some examples, the sources 303 may export the metadata based on the monotonic time source—e.g., the sources 303 may indicate for each exported row in each exported table, each exported table, or both, a timestamp derived from the monotonic time source.

The server network 307 may be configured to receive and cache metadata exported from the sources 303. In some examples, the server network 307 includes a network of servers and is operated by a different party than the destination 301 and the sources 303. In some examples, the server network 307 may be a robust network of servers that provides redundant, high-bandwidth, and reliable coverage across the geographic region that includes the sources 303 and the destination 301. In some examples, the server network 307 includes the any combination of the Google Cloud network, the Amazon web services network, the Microsoft Azure network, or the like. The server network 307 may also be referred to as a cloud environment.

The messaging component 335 may be configured to coordinate the delivery (e.g., asynchronously) of messages between different components of the data management system. In some examples, the messaging component 335 may enable components to publish messages for other components and may enable components to load (e.g., at a later time) published messages intended for the components. In some examples, the messaging component 335 may be implemented using Google Pub/Sub. In some examples, instead of using the messaging component 335, components within the data management system may communicate messages directly with one another.

The destination 301, the sources 303, and the server network 307 may be connected with one another via the networks 320. As described herein, the networks 320 may use one or more overlapping network links. In some examples, one or more of the networks 320 that connect the destination 301 and sources 303 may be less reliable (e.g., as compared to the networks that connect the destination 301 and the sources 303 to the server network 307). As described herein, the sources 303 may be distributed across a geographic region and, thus, the destination 301 may use different networks to access different sources. For example, the destination 301 may be connected to the first source 303-1 via the first network 320-1, the second source 303-2 via the second network 320-2, and so on. The server network 307 may be connected to the sources 303 via third network 320-3 through Nth network 320-N as well as to the destination 301 via fifth network 320-5.

Figure 4:
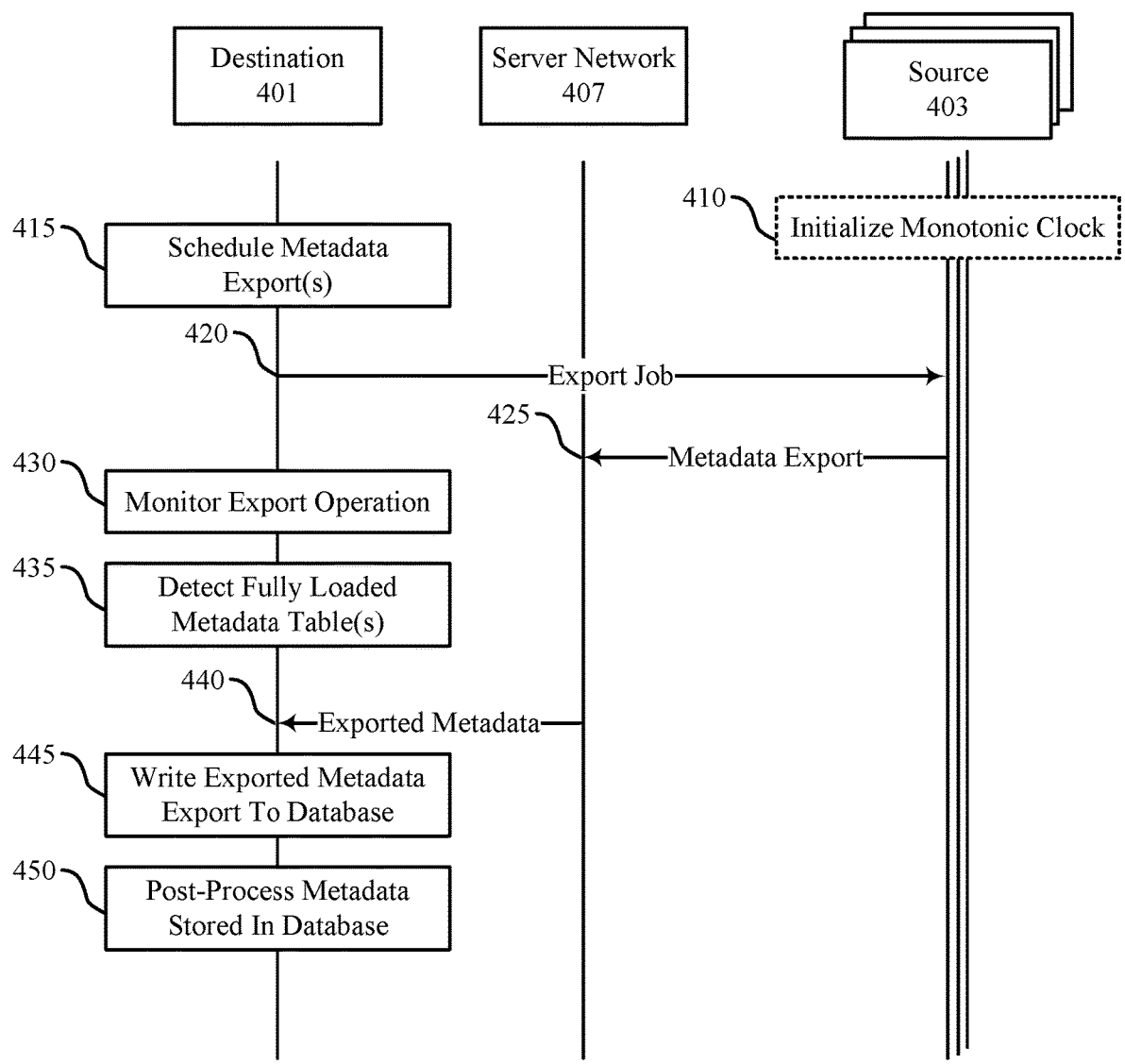
FIG. 4 illustrates an example of a set of operations for incremental synchronization of metadata in accordance with aspects of the present disclosure.

FIG. 4 illustrates an example of a set of operations for incremental synchronization of metadata in accordance with examples as disclosed herein.

The process flow 400 may be performed by the destination 401, the server network 407, and the sources (including the source 403), which may be respective examples of a destination, a server network, and the sources described herein (e.g., the destination 301, the server network 307, and the sources 303 of FIG. 3). In some examples, the process flow 400 shows an example set of operations performed to support incremental synchronization of metadata. For example, the process flow 400 may include operations for exporting to and loading from cluster-level data protection metadata from a network server.

At 410, the sources (including the source 403) may initialize respective monotonic clocks. In some examples, the sources may initialize the respective monotonic clocks at different times. For example, each of the sources may initialize its corresponding monotonic clock when the source is activated, when the source is allocated for protection of computing resources, or the like. As described herein, the monotonic clocks at the sources may count up from a zero value after initialization—e.g., at a constant rate. The sources may use the monotonic clocks to update a timestamp of rows and/or tables for data protection metadata (which may be referred to as metadata) stored at the sources—e.g., each time a row and/or table is updated.

At 415, the destination 401 may schedule one or more export jobs for one or more of the sources to export respective metadata to the server network 407. In some examples, a pulling component (e.g., the pulling component 345 of FIG. 3) at the destination 401 may schedule the one or more jobs. In some examples, individual synchronization workers at the pulling component may manage the execution of respective export jobs for a source. In some cases, multiple export jobs are scheduled for a single source, where the multiple export jobs may be managed by separate synchronization workers and run in parallel.

Scheduling the one or more export jobs may include identifying sources (which may be referred to as delayed sources) that have not exported metadata to the server network 407 for a threshold duration. Additionally, or alternatively, scheduling the one or more export jobs may include identifying sources that are scheduled to export metadata in accordance with a periodic schedule. In some examples, the pulling component may schedule the sources that are scheduled to export metadata within a periodic interval. Additionally, or alternatively, the pulling component may schedule one or more delayed sources. In some cases, the pulling component may prioritize the scheduling of the delayed sources over the periodically scheduled sources. Additionally, or alternatively, the pulling component may schedule additional worker capacity to a delayed source so that the metadata at the delayed source may be synchronized at an increased rate. In some examples, if the synchronization delay for a source exceeds a second threshold duration (e.g., a day or longer), the pulling component may alert a user of the delay.

In some examples, the one or more export jobs may be full export jobs, partial export jobs, or both. A full export job may trigger a corresponding source to export all of the metadata (e.g., all of the rows in all of the metadata tables) stored at the source. A partial export job may trigger a corresponding source to export a portion of the metadata (e.g., one or more rows in one or more of the metadata tables) stored at the source, where the portion of the metadata may include only metadata that has been modified since a last export operation for the source. In some cases, the export jobs may include job instance identifiers (which may be referenced as job_ID). For example, an export job for a first source may include an indication of the instance of the export job for the first source, an export job for a second source may include an indication of the instance of the export job for the second source, and so on.

In some examples, the export jobs may also include job version identifiers, which may indicate a version of a set of jobs for a source. For example, a first set of jobs for a first source may be associated with a first job version and a first set of job instances (indexed starting with 0), a second set of jobs for the first source may be associated with a second job version and a second set of job instances (indexed starting with 0), and so on.

At 420, the destination 401 may send one or more of the scheduled export jobs to the sources. In some examples, a job component at the destination 401 (e.g., the job component 340 of FIG. 3) sends the scheduled export jobs. In some examples, the destination 401 sends the one or more export jobs to the sources over one or more networks (e.g., one or more of the networks 320 of FIG. 3). The destination 401 may send the one or more export jobs to the sources in a sequential manner, in a parallel manner, or a combination thereof. In some cases, when sending the export jobs in a parallel manner, the export jobs may include indications of when to initiate the respective export jobs—e.g., to allow for sequential or overlapping execution of the export jobs. In some examples, an export job may indicate a periodic schedule for a source to export metadata to the server network 407.

At 425, one or more of the sources (e.g., the source 403) may export metadata to the server network 407. In some examples, the sources may export metadata to the server network sequentially, in parallel, or a combination thereof. Each row exported by the source may include a column associated with the version job version and a column associated with the job instance. In some cases, a source may perform a full metadata export—e.g., based on receiving a full export job. In other cases, the source may perform a partial metadata export—e.g., based on receiving a partial export job.

In some examples, a source (e.g., the source 403) stores the metadata in one or more tables and exports metadata to the server network on a table-by-table basis (e.g., in a comma separated value format). For example, the source may be configured to export one or more tables to one or more paths of the server network 407 (which may be indicated in the export jobs). The source may be further configured to export the one or more tables to the designated paths as objects (e.g., rather than files). Exporting the tables as objects may enable data to be transferred to the server network 407 at higher data rates relative to other data structures.

For a partial export job, a source may be configured to export a subset of the rows in one or more tables to one or more designated paths—e.g., the rows that have been modified since a last export job was performed for a corresponding table. In some examples, the source identifies rows that have been modified since the last export by comparing timestamps of the rows with a timestamp of the last export job. In some examples, the timestamp of the last export job is derived from a monotonic clock at the source.

At 430, the destination 401 (e.g., the pulling component of the destination 401) may monitor the progress of the export operations to the server network 407. For example, the destination 401 may periodically poll the paths of the server network 407 where tables are expected to be exported by the sources to determine whether a metadata table has been fully uploaded to a path.

At 435, the destination 401 (e.g., the pulling component of the destination 401) may detect that one or more of the exported metadata tables has been fully exported to the server network 407. Based on detecting that the one or more metadata tables have been fully exported to the server network 407, the pulling component may indicate to a loading component of the destination 401 (e.g., the loading component 360 of FIG. 3) that one or more metadata tables have been fully exported to the server network 307. In some examples, indicating that a metadata table has been fully exported includes publishing, to a messaging component (e.g., the messaging component 335 of FIG. 3) a message indicating that the metadata table has been fully exported to a path in the server network 407.

In some examples, the pulling component may indicate which metadata tables have been fully exported to the server network in accordance with dependencies between the metadata tables. That is, the pulling component may wait to indicate that a metadata table has been fully exported if information in the metadata table depends on information in another metadata table has not yet been fully exported Once the other metadata table is fully exported, the pulling component may indicate to the loading component that both metadata tables have been fully exported—e.g., so that the loading component may load the tables in an order that is consistent with the metadata table dependencies. In some examples, a loading framework for the exported metadata may be determined by performing a topological sorting operation that enables an ordering of the metadata tables to be computed. Independent metadata tables that do not depend on other metadata tables may support parallel loading operations.

At 440, the destination 401 (e.g., the loading component of the destination 401) may download the exported metadata from the server network 407. The loading component may download the exported metadata on a table-by-table basis—e.g., based on loading a message from the messaging component indicating that a metadata table has been fully exported (which may be referred to as a "loading message").

In some examples, multiple loading workers at the loading component may execute separate loading jobs to load one or more exported metadata tables into the destination 401. In such cases, each loading worker may poll the messaging component to determine whether a loading message has been published for a metadata table. Based on identifying that a message has been published, one of the loading workers may load the loading message and begin loading the corresponding metadata table. Once the loading worker loads the message, the other loading workers may ignore the message picked up by the loading worker and may poll the messaging component for subsequent loading messages indicating that another metadata table has been fully exported.

In some examples, the loading component may load the metadata tables in accordance with table dependencies—e.g., based on a timing of when a loading message is published. For example, the loading component may load metadata tables in the order in which the loading messages are published. Additionally, or alternatively, the loading component may identify table dependencies for the exported metadata tables and load the metadata tables in an order that is consistent with the identified metadata table dependencies. Additionally, or alternatively, the loading component may load the metadata tables regardless of the table dependencies and determine an order for writing the loaded metadata tables to a database of the destination (e.g., the database 355 of FIG. 3) based on identifying the metadata table dependencies. The loading component may arrange the downloaded metadata tables in accordance with the determined ordering for the metadata tables.

At 445, the destination 401 (e.g., the loading component of the destination 401) may write the downloaded metadata tables to the database of the destination 401 (which may be referred to as the destination database). In some examples, the destination 401 may write the metadata tables to the database in accordance with the identified metadata table dependencies.

Writing the downloaded metadata may include iterating over each downloaded row of metadata and determining whether the row exists in the destination database. If the downloaded row does not exist in the destination database, the loading component may write the downloaded row to a corresponding table in the destination database (which may be referred to as a "destination table"). If the downloaded row does exist in the destination database, writing the downloaded metadata may also include determining whether the job version associated with the downloaded row is different from the job version associated with the corresponding existing row in the destination database (which may be referred to as a "destination row"). If the job versions are different, the loading component may overwrite the existing destination row with the downloaded row.

If the downloaded row does exist in the destination database and the job versions match, writing the downloaded metadata may also include determining whether a timestamp of the downloaded row is different from a timestamp of the corresponding destination row in the destination database. If the timestamp of the downloaded row occurs after the timestamp of the corresponding destination row, the loading component may overwrite the destination row with the downloaded row. Otherwise, if the timestamp of the downloaded row occurs before the timestamp of the corresponding existing row, the loading component may not overwrite the destination row.

In some examples, instead of immediately overwriting the destination row after determining the timestamp of the downloaded row occurs subsequent to the timestamp of the corresponding destination row, writing the downloaded metadata may include determining whether the content in the downloaded row is the same as the content in the destination row. If the content of the downloaded row occurs is different from the content of the corresponding destination row, the loading component may overwrite the destination row with the downloaded row. Otherwise, if the content of the downloaded row occurs is the same as the content of the destination row, the loading component may not overwrite the destination row. In some examples, a hash function is applied to the downloaded row and corresponding destination rows, and the resulting outputs are compared to determine whether the content of the downloaded and destination rows are the same or different—e.g., it may be determined that the content of the rows is the same if the hash functions output the same value for both the downloaded and destination rows.

Writing the downloaded metadata to the destination database may include deleting one or more rows from the destination database. For export jobs that involve exporting a full metadata table, identifying rows that have been deleted since a last export operation may involve identifying destination rows in the destination database that do not exist in the downloaded rows. Destination rows that do not exist in the downloaded rows may be deleted. In some examples, destination rows corresponding to rows that are deleted at a source may be marked as deleted but not actually deleted from the destination. In such cases, a destination row may include a timestamp indicating a time at which the destination row was marked as deleted. In some examples, the destination rows marked for deletion may be retained in the destination database indefinitely (e.g., for compliance reasons). In other examples, the destination rows marked for deletion may be retained for a threshold duration before deletion from the destination database.

One option for deleting destination rows from the destination database includes loading all of the destination rows of a table from the destination database into memory, and based on loading the destination rows into memory, marking the destination rows that are present in the downloaded metadata table as each downloaded row is analyzed. In such cases, the destination rows that are not marked after all of the downloaded rows have been analyzed may be deleted.

Another option for deleting destination rows from the destination database includes iterating over each destination row of a destination table and each row in the downloaded metadata table and performing the following operations:

```
if iter_dest.primary_key == iter_source.primary_key {
  // Check if row needs to be updated in dest
  iter_dest++
  iter_source++
}
else if iter_dest < iter_source {
   delete iter_dest;
   iter_dest++;
}
else if iter_dest > iter_source {
   insert iter_source;
   iter_source++;
}
```

In some examples, the rows in the downloaded metadata tables may be sorted in order of primary keys. After the downloaded metadata is written to the destination database, the metadata stored in the destination database for a source may be synchronized with the metadata stored in the source.

At 450, the destination 401 may perform post-processing operations. In some examples, the post-processing operations may be performed by a pulling component of the destination 401 (e.g., the pulling component 345 of FIG. 3), a hierarchy component of the destination 401 (e.g., the hierarchy component 350 of FIG. 3), or both. In some examples, the pulling component of the destination 401 is used to perform custom post-processing of the tables in the destination database (which may be referred to as "destination tables"). For example, the pulling component may be configured to perform user-defined post-processing for updated metadata in the destination database. In some examples, the post-processing may be performed for all of the destination rows in a destination table. In other examples, the post-processing may be performed only for destination rows that have been modified during the loading operation. In some examples, the pulling component identifies the rows and/or tables that have been modified by reading a job-identifier field in the rows and/or tables. In some examples, the user-defined post-processing may involve aggregating values from one or more destination rows and storing the aggregated value in another destination table. Additionally, or alternatively, the user-defined post-processing may involve extracting data (e.g., extracting one field from a column storing a JavaScript Object Notation (JSON) value) and storing the extracted values in another destination table. Additionally, or alternatively, the user-defined post-processing may involve copying a subset of destination rows from one destination table to another table—e.g., copying SLAs in one destination table to a destination table at the destination that separately stores the SLAs.

The hierarchy component of the destination 401 may be used to perform hierarchical post-processing of the destination tables. In some examples, metadata in the destination tables may form a hierarchy such that objects in a table have a tree-like relationship. In such cases, the hierarchy edges of the destination tables may be stored in separate tables at the destination 401, and edges of the hierarchy may be modified, updated, or deleted based on updates to the destination tables. For example, a change to an SLA for a particular VM or VM group may result in a change to the SLA for other VMs. In some examples, setting an SLA for a VM center may result in a change to the SLAs of all of the VMs that are included in the VM center.

Aspects of the process flow 400 may be implemented by a controller, among other components. Additionally, or alternatively, aspects of the process flow 400 may be implemented as instructions stored in memory (e.g., firmware stored in a memory coupled with a controller). For example, the instructions, when executed by a controller, may cause the controller to perform the operations of the process flow 400.

One or more of the operations described in the process flow 400 may be performed earlier or later, omitted, replaced, supplemented, or combined with another operation. Also, additional operations described herein may replace, supplement, or be combined with one or more of the operations described in the process flow 400.

Figure 5:
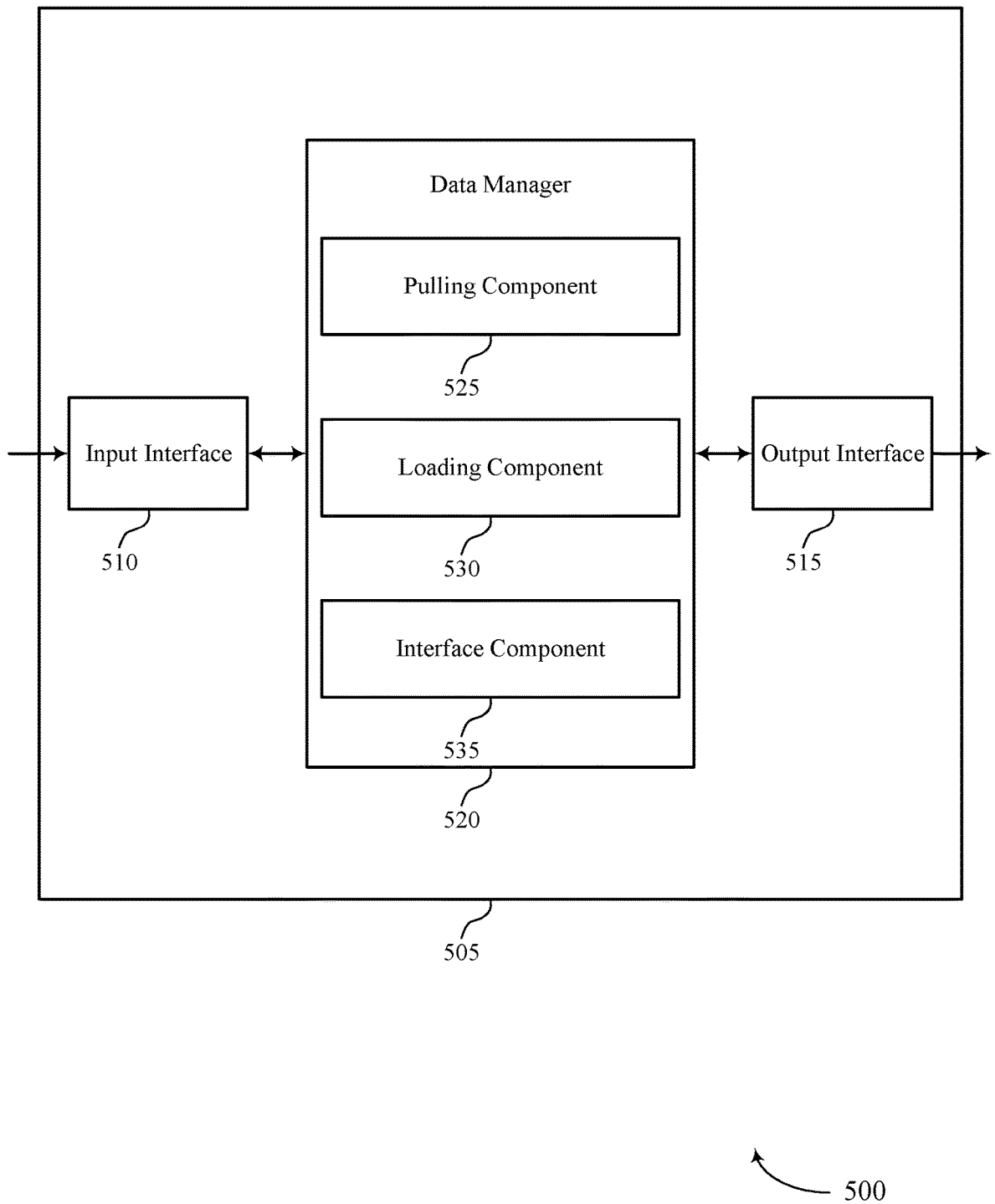
FIG. 5 illustrates a block diagram of an apparatus that supports incremental synchronization of metadata in accordance with aspects of the present disclosure.

FIG. 5 illustrates a block diagram 500 of a system 505 that supports incremental synchronization of metadata in accordance with aspects of the present disclosure. In some examples, the system 505 may be an example of aspects of one or more components described with reference to FIG. 1, such as a DMS 110. The system 505 may include an input interface 510, an output interface 515, and a data manager 520. The system 505 may also include one or more processors. Each of these components may be in communication with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the data manager 520 to support incremental synchronization of metadata. In some cases, the input interface 510 may be a component of a network interface 725 as described with reference to FIG. 7.

The output interface 515 may manage output signaling for the system 505. For example, the output interface 515 may receive signaling from other components of the system 505, such as the data manager 520, and may transmit such output signaling corresponding to (e.g., representative of or otherwise based on) such signaling to other systems or devices. In some cases, the output interface 515 may be a component of a network interface 725 as described with reference to FIG. 7.

For example, the data manager 520 may include a pulling component 525, a loading component 530, an interface component 535, or any combination thereof. In some examples, the data manager 520, or various components thereof, may be configured to perform various operations (e.g., receiving, monitoring, transmitting) using or otherwise in cooperation with the input interface 510, the output interface 515, or both. For example, the data manager 520 may receive information from the input interface 510, send information to the output interface 515, or be integrated in combination with the input interface 510, the output interface 515, or both to receive information, transmit information, or perform various other operations as described herein.

The pulling component 525 may be configured as or otherwise support a means for triggering, by a management system that is coupled with a set of data management clusters that provide data protection for a set of computing objects and store metadata associated with providing the data protection for the set of computing objects, a data management cluster of the set of data management clusters to export, to a cloud environment, respective metadata for the data management cluster, where the respective metadata for the data management cluster is associated with providing the data protection for one or more computing objects of the set of computing objects and the management system is coupled with the set of data management clusters via a set of multiple network connections. The loading component 530 may be configured as or otherwise support a means for downloading, by the management system, from the cloud environment, after triggering the export, the respective metadata for the data management cluster. The loading component 530 may be configured as or otherwise support a means for writing, by the management system, the downloaded metadata for the data management cluster to a database configured to store a version of the metadata associated with providing the data protection for the set of computing objects. The interface component 535 may be configured as or otherwise support a means for providing, by the management system, an interface for managing the operation of the set of data management clusters, where a content of the interface reflects the version of the metadata associated with providing the data protection for the set of computing objects, the reflected version of the metadata based on the downloaded metadata for the data management cluster.

Figure 6:
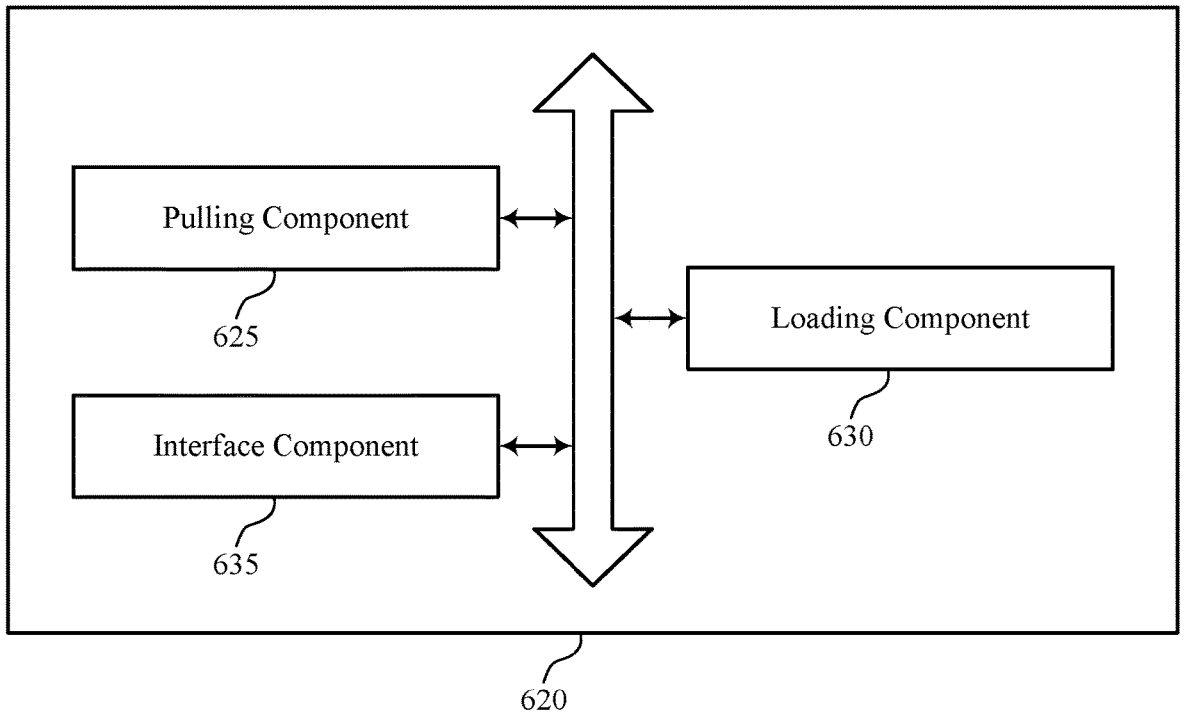
FIG. 6 illustrates a block diagram of a data manager that supports incremental synchronization of metadata in accordance with aspects of the present disclosure.

FIG. 6 illustrates a block diagram 600 of a data manager 620 that supports incremental synchronization of metadata in accordance with aspects of the present disclosure. The data manager 620 may be an example of aspects of a data manager or a data manager 520, or both, as described herein. The data manager 620, or various components thereof, may be an example of means for performing various aspects of incremental synchronization of metadata as described herein. For example, the data manager 620 may include a pulling component 625, a loading component 630, an interface component 635, or any combination thereof. Each of these components may communicate, directly or indirectly, with one another (e.g., via one or more buses, communications links, communications interfaces, or any combination thereof).

The pulling component 625 may be configured as or otherwise support a means for triggering, by a management system that is coupled with a set of data management clusters that provide data protection for a set of computing objects and store metadata associated with providing the data protection for the set of computing objects, a data management cluster of the set of data management clusters to export, to a cloud environment, respective metadata for the data management cluster, where the respective metadata for the data management cluster is associated with providing the data protection for one or more computing objects of the set of computing objects and the management system is coupled with the set of data management clusters via a set of multiple network connections. The loading component 630 may be configured as or otherwise support a means for downloading, by the management system, from the cloud environment, after triggering the export, the respective metadata for the data management cluster. In some examples, the loading component 630 may be configured as or otherwise support a means for writing, by the management system, the downloaded metadata for the data management cluster to a database configured to store a version of the metadata associated with providing the data protection for the set of computing objects. The interface component 635 may be configured as or otherwise support a means for providing, by the management system, an interface for managing the operation of the set of data management clusters, where a content of the interface reflects the version of the metadata associated with providing the data protection for the set of computing objects, the reflected version of the metadata based on the downloaded metadata for the data management cluster.

In some examples, the pulling component 625 may be configured as or otherwise support a means for monitoring, based on triggering the data management cluster to export the respective metadata, one or more paths in the cloud environment for respective information exported by the data management cluster and associated with one or more metadata tables hosted at the data management cluster, where downloading the respective metadata for the data management cluster includes downloading portions of the respective information that are fully uploaded to respective paths of one or more paths in the cloud environment.

In some examples, the set of data management clusters includes monotonically increasing time sources that indicate elapsed times since respective reference events, and may be configured as or otherwise support a means for exporting the respective metadata with a timestamp obtained using a monotonically increasing time source of the data management cluster.

In some examples, based at least in part on the management system triggering the data management cluster to export the respective metadata, the data management cluster may be configured as or otherwise support a means for exporting, to respective paths of the cloud environment as data objects, respective information for one or more metadata tables hosted at the data management cluster.

In some examples, the respective information for the one or more metadata tables comprises one or more rows of respective metadata tables.

In some examples, the one or more rows exported to the cloud environment are associated with updates having timestamps that are later than a timestamp of a prior export operation.

In some examples, based at least in part on downloading the respective metadata for the data management cluster, the loading component 630 may be further configured as or otherwise support a means for determining, based at least in part on downloading the one or more metadata tables, dependencies for the one or more metadata tables: and arrange the one or more metadata tables in accordance with the dependencies.

In some examples, to write the downloaded metadata to the database, the loading component 630 may be further configured as or otherwise support a means for writing the one or more metadata tables into the database in accordance with an arrangement of the one or more metadata tables that results from the arranging, wherein the management system is configured to write independent metadata tables of the one or more metadata tables in parallel.

In some examples, the loading component 630 includes a plurality of nodes configured to execute loading jobs, wherein the loading jobs are configured to cause the management system to: download, from the cloud environment, respective data objects of one or more data objects in the cloud environment: and write respective metadata tables corresponding to the respective objects into the database.

In some examples, to write the downloaded metadata to the database, the loading component 630 may be further configured as or otherwise support a means for determining, for rows of the one or more metadata tables, whether corresponding rows exist in the database: and writing, to the database, rows of the one or more metadata tables for which a corresponding row is missing from the database.

In some examples, to write the downloaded metadata to the database, the loading component 630 may be further configured as or otherwise support a means for determining, for rows of the one or more metadata tables, whether corresponding rows exist in the database: identifying, from among those rows of the one or more metadata tables for which corresponding rows exist in the database, rows having first timestamps that are later than respective second timestamps for the corresponding rows in the database: and writing, to the database, the identified rows based at least in part on the first timestamps of the written rows being later than the respective second timestamps for the corresponding rows in the database.

In some examples, to write the downloaded metadata to the database, the loading component 630 may be further configured as or otherwise support a means for determining, for the identified rows, whether values in the identified rows are different than values in the corresponding rows in the database, wherein the written rows being written to the database is further based at least in part on the values in the written rows being different than the values in the corresponding rows in the database.

In some examples, to write the downloaded metadata to the database, the loading component 630 may be further configured as or otherwise support a means for determining, for rows of the one or more metadata tables, whether respective version numbers match a version number of a loading job for writing the respective metadata for the data management cluster to the database, the respective version numbers corresponding to a version number of a prior loading job: and writing, to the database, rows of the one or more metadata tables for which there is a mismatch with the version number of the loading job.

In some examples, the version of the metadata stored by the database includes a plurality of metadata tables that include: a first column for indicating a version of a loading job that wrote a respective row to the database, and a second column for indicating an instance of the loading job that wrote the respective row to the database: and the database includes a table that stores respective versions of one or more loading jobs running at the management system.

In some examples, the loading component 630 may be configured as or otherwise support a means for identifying information at the data management cluster that has been deleted or marked as deleted based at least in part on the downloaded metadata: and deleting corresponding information from the version of the metadata based at least in part on the information that has been deleted or marked as deleted.

In some examples, the loading component 630 may be configured as or otherwise support a means for writing the downloaded metadata to a first set of rows of a first set of metadata tables in the database, and the pulling component 625 may be configured as or otherwise support a means for updating a second set of rows in a second set of metadata tables in the database based at least in part on writing the downloaded metadata to the first set of rows of the first set of metadata tables.

In some examples, the pulling component 625 may be configured as or otherwise support a means for monitoring, for respective data management clusters of the set of data management clusters, for a time at which a last successful metadata synchronization procedure was performed: and scheduling metadata synchronization procedures for the respective data management clusters based at least in part on the monitoring.

Figure 7:
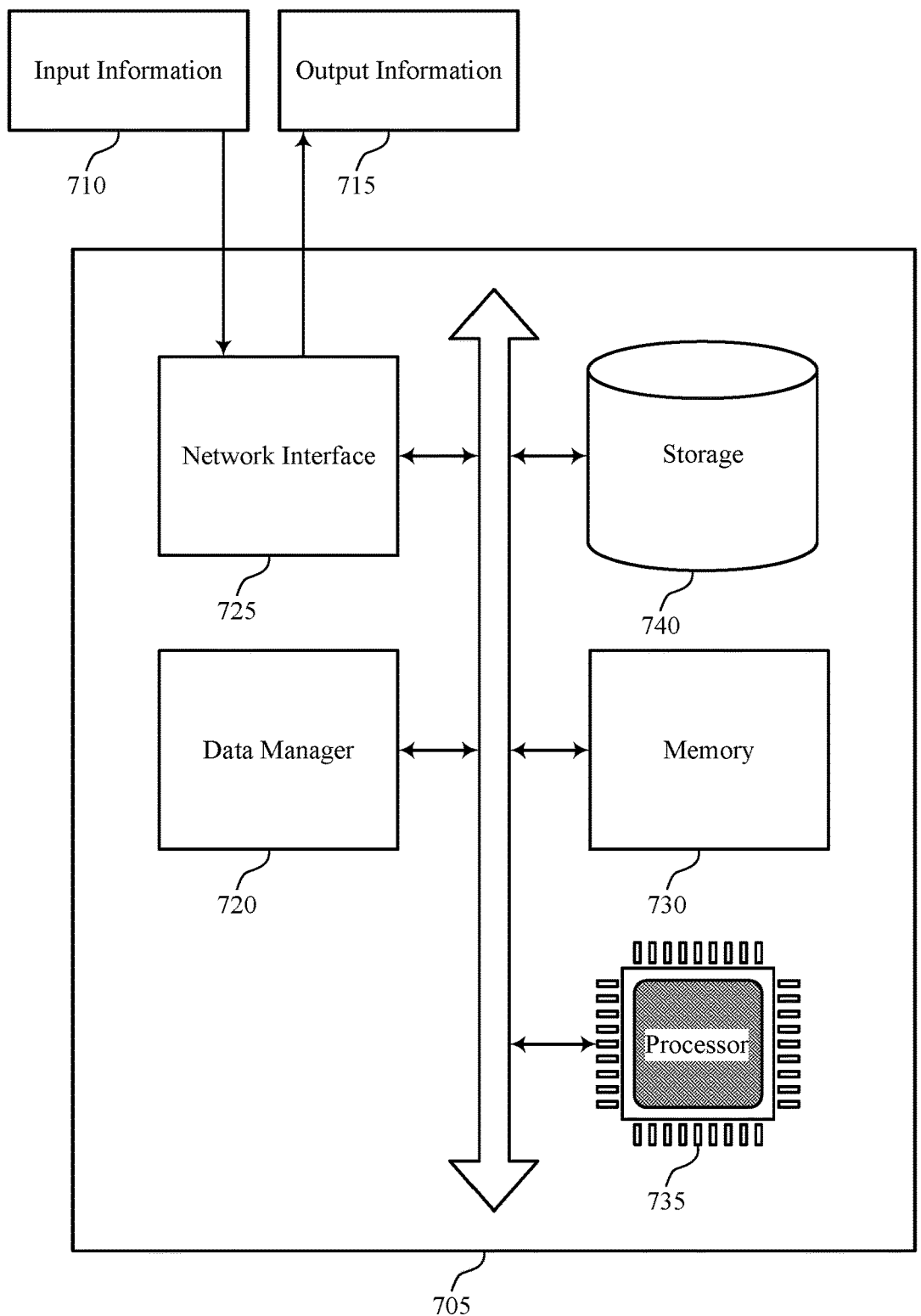
FIG. 7 illustrates a diagram of a system including a device that supports incremental synchronization of metadata in accordance with aspects of the present disclosure.

FIG. 7 illustrates a block diagram 700 of a system 705 that supports incremental synchronization of metadata in accordance with aspects of the present disclosure. The system 705 may be an example of or include the components of a system 505 as described herein.

The system 705 may include components for data management, including components such as a data manager 720), an input information 710, an output information 715, a network interface 725, a memory 730, a processor 735, and a storage 740. These components may be in electronic communication or otherwise coupled with each other (e.g., operatively, communicatively, functionally, electronically, electrically: via one or more buses, communications links, communications interfaces, or any combination thereof). Additionally, the components of the system 705 may include corresponding physical components or may be implemented as corresponding virtual components (e.g., components of one or more virtual machines). In some examples, the system 705 may be an example of aspects of one or more components described with reference to FIG. 1, such as a DMS 110.

The network interface 725 may enable the system 705 to exchange information (e.g., input information 710), output information 715, or both) with other systems or devices (not shown). For example, the network interface 725 may enable the system 705 to connect to a network (e.g., a network 120 as described herein). The network interface 725 may include one or more wireless network interfaces, one or more wired network interfaces, or any combination thereof. In some examples, the network interface 725 may be an example of may be an example of aspects of one or more components described with reference to FIG. 1, such as one or more network interfaces 165.

Memory 730 may include RAM, ROM, or both. The memory 730 may store computer-readable, computer-executable software including instructions that, when executed, cause the processor 735 to perform various functions described herein. In some cases, the memory 730 may contain, among other things, a basic input/output system (BIOS), which may control basic hardware or software operation such as the interaction with peripheral components or devices. In some cases, the memory 730 may be an example of aspects of one or more components described with reference to FIG. 1, such as one or more memories 175.

The processor 735 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 735 may be configured to execute computer-readable instructions stored in a memory 730 to perform various functions (e.g., functions or tasks supporting incremental synchronization of metadata). Though a single processor 735 is depicted in the example of FIG. 7, it is to be understood that the system 705 may include any quantity of one or more of processors 735 and that a group of processors 735 may collectively perform one or more functions ascribed herein to a processor, such as the processor 735. In some cases, the processor 735 may be an example of aspects of one or more components described with reference to FIG. 1, such as one or more processors 170.

Storage 740 may be configured to store data that is generated, processed, stored, or otherwise used by the system 705. In some cases, the storage 740 may include one or more HDDs, one or more SDDs, or both. In some examples, the storage 740) may be an example of a single database, a distributed database, multiple distributed databases, a data store, a data lake, or an emergency backup database. In some examples, the storage 740 may be an example of one or more components described with reference to FIG. 1, such as one or more network disks 180.

For example, the data manager 720 may be configured as or otherwise support a means for triggering, by a management system that is coupled with a set of data management clusters that provide data protection for a set of computing objects and store metadata associated with providing the data protection for the set of computing objects, a data management cluster of the set of data management clusters to export, to a cloud environment, respective metadata for the data management cluster, where the respective metadata for the data management cluster is associated with providing the data protection for one or more computing objects of the set of computing objects and the management system is coupled with the set of data management clusters via a set of multiple network connections. The data manager 720) may be configured as or otherwise support a means for downloading, by the management system, from the cloud environment, after triggering the export, the respective metadata for the data management cluster. The data manager 720 may be configured as or otherwise support a means for writing, by the management system, the downloaded metadata for the data management cluster to a database configured to store a version of the metadata associated with providing the data protection for the set of computing objects. The data manager 720) may be configured as or otherwise support a means for providing, by the management system, an interface for managing the operation of the set of data management clusters, where a content of the interface reflects the version of the metadata associated with providing the data protection for the set of computing objects, the reflected version of the metadata based on the downloaded metadata for the data management cluster.

Figure 8:
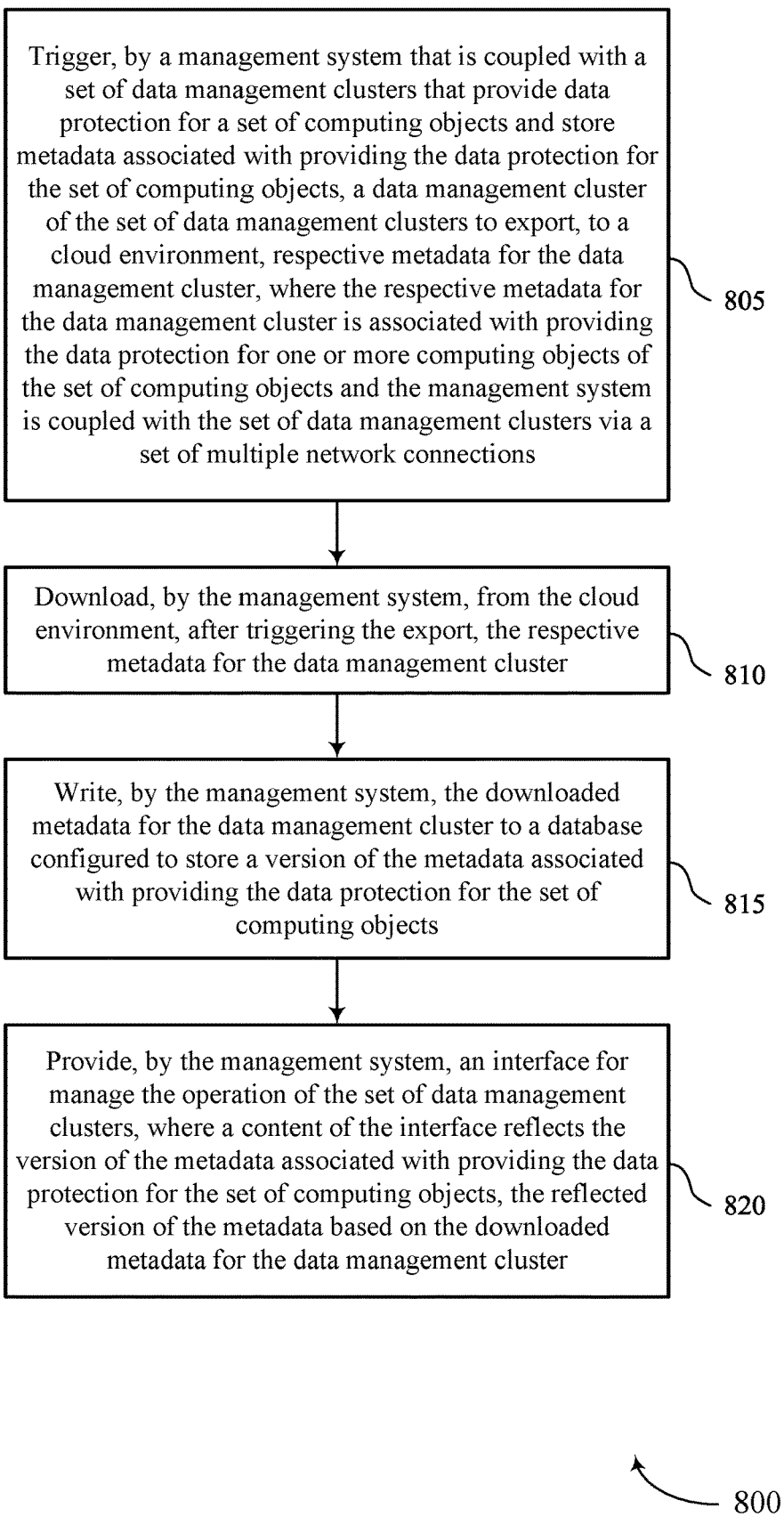
FIG. 8 illustrates a flowchart showing methods that support incremental synchronization of metadata in accordance with aspects of the present disclosure.

FIG. 8 illustrates a flowchart showing a method 800 that supports incremental synchronization of metadata in accordance with aspects of the present disclosure. The operations of the method 800 may be implemented by a DMS or its components as described herein. For example, the operations of the method 800 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 805, the method may include triggering, by a management system that is coupled with a set of data management clusters that provide data protection for a set of computing objects and store metadata associated with providing the data protection for the set of computing objects, a data management cluster of the set of data management clusters to export, to a cloud environment, respective metadata for the data management cluster, where the respective metadata for the data management cluster is associated with providing the data protection for one or more computing objects of the set of computing objects and the management system is coupled with the set of data management clusters via a set of multiple network connections. The operations of 805 may be performed in accordance with examples as disclosed herein. In some examples, aspects of the operations of 805 may be performed by a pulling component 625 as described with reference to FIG. 6.

At 810, the method may include downloading, by the management system, from the cloud environment, after triggering the export, the respective metadata for the data management cluster. The operations of 810 may be performed in accordance with examples as disclosed herein. In some examples, aspects of the operations of 810 may be performed by a loading component 630 as described with reference to FIG. 6.

At 815, the method may include writing, by the management system, the downloaded metadata for the data management cluster to a database configured to store a version of the metadata associated with providing the data protection for the set of computing objects. The operations of 815 may be performed in accordance with examples as disclosed herein. In some examples, aspects of the operations of 815 may be performed by a loading component 630) as described with reference to FIG. 6.

At 820, the method may include providing, by the management system, an interface for managing the operation of the set of data management clusters, where a content of the interface reflects the version of the metadata associated with providing the data protection for the set of computing objects, the reflected version of the metadata based on the downloaded metadata for the data management cluster. The operations of 820 may be performed in accordance with examples as disclosed herein. In some examples, aspects of the operations of 820 may be performed by an interface component 635 as described with reference to FIG. 6.

A method is described. The method may include triggering, by a management system that is coupled with a set of data management clusters that provide data protection for a set of computing objects and store metadata associated with providing the data protection for the set of computing objects, a data management cluster of the set of data management clusters to export, to a cloud environment, respective metadata for the data management cluster, where the respective metadata for the data management cluster is associated with providing the data protection for one or more computing objects of the set of computing objects and the management system is coupled with the set of data management clusters via a set of multiple network connections, downloading, by the management system, from the cloud environment, after triggering the export, the respective metadata for the data management cluster, writing, by the management system, the downloaded metadata for the data management cluster to a database configured to store a version of the metadata associated with providing the data protection for the set of computing objects, and providing, by the management system, an interface for managing the operation of the set of data management clusters, where a content of the interface reflects the version of the metadata associated with providing the data protection for the set of computing objects, the reflected version of the metadata based on the downloaded metadata for the data management cluster.

An apparatus is described. The apparatus may include a processor, memory coupled with the processor, and instructions stored in the memory. The instructions may be executable by the processor to cause the apparatus to trigger, by a management system that is coupled with a set of data management clusters that provide data protection for a set of computing objects and store metadata associated with providing the data protection for the set of computing objects, a data management cluster of the set of data management clusters to export, to a cloud environment, respective metadata for the data management cluster, where the respective metadata for the data management cluster is associated with providing the data protection for one or more computing objects of the set of computing objects and the management system is coupled with the set of data management clusters via a set of multiple network connections, download, by the management system, from the cloud environment, after triggering the export, the respective metadata for the data management cluster, write, by the management system, the downloaded metadata for the data management cluster to a database configured to store a version of the metadata associated with providing the data protection for the set of computing objects, and providing, by the management system, an interface for manage the operation of the set of data management clusters, where a content of the interface reflects the version of the metadata associated with providing the data protection for the set of computing objects, the reflected version of the metadata based on the downloaded metadata for the data management cluster.

Another apparatus is described. The apparatus may include means for triggering, by a management system that is coupled with a set of data management clusters that provide data protection for a set of computing objects and store metadata associated with providing the data protection for the set of computing objects, a data management cluster of the set of data management clusters to export, to a cloud environment, respective metadata for the data management cluster, where the respective metadata for the data management cluster is associated with providing the data protection for one or more computing objects of the set of computing objects and the management system is coupled with the set of data management clusters via a set of multiple network connections, means for downloading, by the management system, from the cloud environment, after triggering the export, the respective metadata for the data management cluster, means for writing, by the management system, the downloaded metadata for the data management cluster to a database configured to store a version of the metadata associated with providing the data protection for the set of computing objects, and means for providing, by the management system, an interface for managing the operation of the set of data management clusters, where a content of the interface reflects the version of the metadata associated with providing the data protection for the set of computing objects, the reflected version of the metadata based on the downloaded metadata for the data management cluster.

A non-transitory computer-readable medium storing code is described. The code may include instructions executable by a processor to trigger, by a management system that is coupled with a set of data management clusters that provide data protection for a set of computing objects and store metadata associated with providing the data protection for the set of computing objects, a data management cluster of the set of data management clusters to export, to a cloud environment, respective metadata for the data management cluster, where the respective metadata for the data management cluster is associated with providing the data protection for one or more computing objects of the set of computing objects and the management system is coupled with the set of data management clusters via a set of multiple network connections, download, by the management system, from the cloud environment, after triggering the export, the respective metadata for the data management cluster, write, by the management system, the downloaded metadata for the data management cluster to a database configured to store a version of the metadata associated with providing the data protection for the set of computing objects, and providing, by the management system, an interface for manage the operation of the set of data management clusters, where a content of the interface reflects the version of the metadata associated with providing the data protection for the set of computing objects, the reflected version of the metadata based on the downloaded metadata for the data management cluster.

Some examples of the method, apparatuses, and non-transitory computer-readable medium described herein may further include operations, features, means, or instructions for monitoring, based on triggering the data management cluster to export the respective metadata, one or more paths in the cloud environment for respective information exported by the data management cluster and associated with one or more metadata tables hosted at the data management cluster, where downloading the respective metadata for the data management cluster includes downloading portions of the respective information that may be fully uploaded to respective paths of one or more paths in the cloud environment.

In some examples of the method, apparatuses, and non-transitory computer-readable medium described herein, the set of data management clusters includes monotonically increasing time sources that indicate elapsed times since respective reference events, and may be configured as or otherwise support a means for exporting the respective metadata with a timestamp obtained using a monotonically increasing time source of the data management cluster.

In some examples of the method, apparatuses, and non-transitory computer-readable medium described herein, based at least in part on the management system triggering the data management cluster to export the respective metadata, the data management cluster may be configured as or otherwise support a means for exporting, to respective paths of the cloud environment as data objects, respective information for one or more metadata tables hosted at the data management cluster.

In some examples of the method, apparatuses, and non-transitory computer-readable medium described herein, the respective information for the one or more metadata tables comprises one or more rows of respective metadata tables.

In some examples of the method, apparatuses, and non-transitory computer-readable medium described herein, the one or more rows exported to the cloud environment are associated with updates having timestamps that are later than a timestamp of a prior export operation.

In some examples, based at least in part on downloading the respective metadata for the data management cluster, the method, apparatuses, and non-transitory computer-readable medium described herein may further include operations, features, means, or instructions for determining, based at least in part on downloading the one or more metadata tables, dependencies for the one or more metadata tables: and arrange the one or more metadata tables in accordance with the dependencies.

In some examples, to write the downloaded metadata to the database, the method, apparatuses, and non-transitory computer-readable medium described herein may further include operations, features, means, or instructions for writing the one or more metadata tables into the database in accordance with an arrangement of the one or more metadata tables that results from the arranging, wherein the management system is configured to write independent metadata tables of the one or more metadata tables in parallel.

In some examples, the method, apparatuses, and non-transitory computer-readable medium described herein may further include a plurality of nodes configured to execute loading jobs, wherein the loading jobs are configured to cause the management system to: download, from the cloud environment, respective data objects of one or more data objects in the cloud environment: and write respective metadata tables corresponding to the respective objects into the database.

In some examples, to write the downloaded metadata to the database, the method, apparatuses, and non-transitory computer-readable medium described herein may further include operations, features, means, or instructions for determining, for rows of the one or more metadata tables, whether corresponding rows exist in the database; and writing, to the database, rows of the one or more metadata tables for which a corresponding row is missing from the database.

In some examples, to write the downloaded metadata to the database, the method, apparatuses, and non-transitory computer-readable medium described herein may further include operations, features, means, or instructions for determining, for rows of the one or more metadata tables, whether corresponding rows exist in the database: identifying, from among those rows of the one or more metadata tables for which corresponding rows exist in the database, rows having first timestamps that are later than respective second timestamps for the corresponding rows in the database: and writing, to the database, the identified rows based at least in part on the first timestamps of the written rows being later than the respective second timestamps for the corresponding rows in the database.

In some examples, to write the downloaded metadata to the database, the method, apparatuses, and non-transitory computer-readable medium described herein may further include operations, features, means, or instructions for determining, for the identified rows, whether values in the identified rows are different than values in the corresponding rows in the database, wherein the written rows being written to the database is further based at least in part on the values in the written rows being different than the values in the corresponding rows in the database.

In some examples, to write the downloaded metadata to the database, the method, apparatuses, and non-transitory computer-readable medium described herein may further include operations, features, means, or instructions for determining, for rows of the one or more metadata tables, whether respective version numbers match a version number of a loading job for writing the respective metadata for the data management cluster to the database, the respective version numbers corresponding to a version number of a prior loading job: and writing, to the database, rows of the one or more metadata tables for which there is a mismatch with the version number of the loading job.

In some examples of the method, apparatuses, and non-transitory computer-readable medium described herein, the version of the metadata stored by the database includes a plurality of metadata tables that include: a first column for indicating a version of a loading job that wrote a respective row to the database, and a second column for indicating an instance of the loading job that wrote the respective row to the database: and the database includes a table that stores respective versions of one or more loading jobs running at the management system.

Some examples of the method, apparatuses, and non-transitory computer-readable medium described herein may further include operations, features, means, or instructions for identifying information at the data management cluster that has been deleted or marked as deleted based at least in part on the downloaded metadata: and deleting corresponding information from the version of the metadata based at least in part on the information that has been deleted or marked as deleted.

Some examples of the method, apparatuses, and non-transitory computer-readable medium described herein may further include operations, features, means, or instructions for writing the downloaded metadata to a first set of rows of a first set of metadata tables in the database, and updating a second set of rows in a second set of metadata tables in the database based at least in part on writing the downloaded metadata to the first set of rows of the first set of metadata tables.

Some examples of the method, apparatuses, and non-transitory computer-readable medium described herein may further include operations, features, means, or instructions for monitoring, for respective data management clusters of the set of data management clusters, for a time at which a last successful metadata synchronization procedure was performed: and scheduling metadata synchronization procedures for the respective data management clusters based at least in part on the monitoring.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A system, comprising:
    a set of data management clusters configured to provide data protection for a set of computing objects and to store metadata associated with providing the data protection for the set of computing objects, and
    a management system for managing an operation of the set of data management clusters, wherein the management system is coupled with the set of data management clusters via a plurality of network connections and configured to:
        trigger a data management cluster of the set of data management clusters to export, to a cloud environment, respective metadata for the data management cluster, wherein the respective metadata for the data management cluster is associated with providing the data protection for one or more computing objects of the set of computing objects,
        download from the cloud environment, after triggering the export, the respective metadata for the data management cluster, write the downloaded metadata for the data management cluster to a database configured to store a version of the metadata associated with providing the data protection for the set of computing objects, and provide an interface for managing the operation of the set of data management clusters, wherein a content of the interface reflects the version of the metadata associated with providing the data protection for the set of computing objects, the reflected version of the metadata based at least in part on the downloaded metadata for the data management cluster.

2. The system of claim 1, wherein the set of data management clusters comprises:
monotonically increasing time sources that indicate elapsed times since respective reference events, wherein the data management cluster exports the respective metadata with a timestamp obtained using a monotonically increasing time source of the data management cluster.

3. The system of claim 1, wherein, based at least in part on the management system triggering the data management cluster to export the respective metadata, the data management cluster is configured to:
export, to respective paths of the cloud environment as data objects, respective information for one or more metadata tables hosted at the data management cluster.

4. The system of claim 3, wherein the respective information for the one or more metadata tables comprises one or more rows of respective metadata tables.

5. The system of claim 4, wherein the one or more rows exported to the cloud environment are associated with updates having timestamps that are later than a timestamp of a prior export operation.

6. The system of claim 1, wherein the management system is further configured to:
monitor, based at least in part on triggering the data management cluster to export the respective metadata, one or more paths in the cloud environment for respective information exported by the data management cluster and associated with one or more metadata tables hosted at the data management cluster,
wherein, to download the respective metadata for the data management cluster, the management system is further configured to download portions of the respective information that are fully uploaded to respective paths of one or more paths in the cloud environment.

7. The system of claim 6, wherein, based at least in part on downloading the respective metadata for the data management cluster, the management system is further configured to:
determine, based at least in part on downloading the one or more metadata tables, dependencies for the one or more metadata tables; and
arrange the one or more metadata tables in accordance with the dependencies.

8. The system of claim 7, wherein, to write the downloaded metadata to the database, the management system is further configured to:
write the one or more metadata tables into the database in accordance with an arrangement of the one or more metadata tables that results from the arranging, wherein the management system is configured to write independent metadata tables of the one or more metadata tables in parallel.

9. The system of claim 6, wherein the management system comprises:

a plurality of nodes configured to execute loading jobs, wherein the loading jobs are configured to cause the management system to:
download, from the cloud environment, respective data objects of one or more data objects in the cloud environment; and
write respective metadata tables corresponding to the respective data objects into the database.

10. The system of claim 6, wherein, to write the downloaded metadata to the database, the management system is further configured to:
determine, for rows of the one or more metadata tables, whether corresponding rows exist in the database; and
write, to the database, rows of the one or more metadata tables for which a corresponding row is missing from the database.

11. The system of claim 6, wherein, to write the downloaded metadata to the database, the management system is further configured to:
determine, for rows of the one or more metadata tables, whether corresponding rows exist in the database;
identify, from among those rows of the one or more metadata tables for which corresponding rows exist in the database, rows having first timestamps that are later than respective second timestamps for the corresponding rows in the database; and
write, to the database, the identified rows based at least in part on the first timestamps of the written rows being later than the respective second timestamps for the corresponding rows in the database.

12. The system of claim 11, wherein, to write the downloaded metadata to the database, the management system is further configured to:
determine, for the identified rows, whether values in the identified rows are different than values in the corresponding rows in the database, wherein the written rows being written to the database is further based at least in part on the values in the written rows being different than the values in the corresponding rows in the database.

13. The system of claim 6, wherein, to write the downloaded metadata to the database, the management system is further configured to:
determine, for rows of the one or more metadata tables, whether respective version numbers match a version number of a loading job for writing the respective metadata for the data management cluster to the database, the respective version numbers corresponding to a version number of a prior loading job; and
write, to the database, rows of the one or more metadata tables for which there is a mismatch with the version number of the loading job.

14. The system of claim 1, wherein:
the version of the metadata stored by the database comprises a plurality of metadata tables that include:
a first column for indicating a version of a loading job that wrote a respective row to the database, and
a second column for indicating an instance of the loading job that wrote the respective row to the database; and
the database comprises a table that stores respective versions of one or more loading jobs running at the management system.

15. The system of claim 1, wherein the management system is further configured to:

identify information at the data management cluster that has been deleted or marked as deleted based at least in part on the downloaded metadata; and delete corresponding information from the version of the metadata based at least in part on the information that has been deleted or marked as deleted.

16. The system of claim 1, wherein the management system is configured to write the downloaded metadata to a first set of rows of a first set of metadata tables in the database, and wherein the management system is further configured to:

update a second set of rows in a second set of metadata tables in the database based at least in part on writing the downloaded metadata to the first set of rows of the first set of metadata tables.

17. The system of claim 1, wherein the management system is further configured to:

monitor, for respective data management clusters of the set of data management clusters, for a time at which a last successful metadata synchronization procedure was performed; and schedule metadata synchronization procedures for the respective data management clusters based at least in part on the monitoring.

18. A method, comprising:

triggering, by a management system that is coupled with a set of data management clusters that provide data protection for a set of computing objects and store metadata associated with providing the data protection for the set of computing objects, a data management cluster of the set of data management clusters to export, to a cloud environment, respective metadata for the data management cluster, wherein:

the respective metadata for the data management cluster is associated with providing the data protection for one or more computing objects of the set of computing objects, and the management system is coupled with the set of data management clusters via a plurality of network connections:

downloading, by the management system, from the cloud environment, after triggering the export, the respective metadata for the data management cluster;

writing, by the management system, the downloaded metadata for the data management cluster to a database configured to store a version of the metadata associated with providing the data protection for the set of computing objects; and providing, by the management system, an interface for managing an operation of the set of data management clusters, wherein a content of the interface reflects the version of the metadata associated with providing the data protection for the set of computing objects, the reflected version of the metadata based at least in part on the downloaded metadata for the data management cluster.

19. The method of claim 18, further comprising:

monitoring, based at least in part on triggering the data management cluster to export the respective metadata, one or more paths in the cloud environment for respective information exported by the data management cluster and associated with one or more metadata tables hosted at the data management cluster, wherein downloading the respective metadata for the data management cluster comprises downloading portions of the respective information that are fully uploaded to respective paths of one or more paths in the cloud environment.

20. A non-transitory, computer-readable medium storing code that comprises instructions executable by a processor of an electronic device to cause the electronic device to:

trigger, by a management system that is coupled with a set of data management clusters that provide data protection for a set of computing objects and store metadata associated with providing the data protection for the set of computing objects, a data management cluster of the set of data management clusters to export, to a cloud environment, respective metadata for the data management cluster, wherein:

the respective metadata for the data management cluster is associated with providing the data protection for one or more computing objects of the set of computing objects, and the management system is coupled with the set of data management clusters via a plurality of network connections:

download, by the management system, from the cloud environment, after triggering the export, the respective metadata for the data management cluster;

write, by the management system, the downloaded metadata for the data management cluster to a database configured to store a version of the metadata associated with providing the data protection for the set of computing objects; and provide, by the management system, an interface for managing an operation of the set of data management clusters, wherein a content of the interface reflects the version of the metadata associated with providing the data protection for the set of computing objects, the reflected version of the metadata based at least in part on the downloaded metadata for the data management cluster.

* * * * *